United States Patent

Linehan

[11] Patent Number: 5,853,631
[45] Date of Patent: Dec. 29, 1998

[54] MOLD HEATER STARTUP METHOD

[75] Inventor: Thomas P. Linehan, Clarkston, Mich.

[73] Assignee: D-M-E Company, Madison Heights, Mich.

[21] Appl. No.: 986,347

[22] Filed: Dec. 8, 1997

[51] Int. Cl.$^6$ ...................................................... B29C 45/74
[52] U.S. Cl. .................................... 264/40.6; 264/328.14; 364/475.07; 425/144; 425/548
[58] Field of Search .................... 264/40.1, 40.6, 264/39, 328.14, 328.15, 328.16; 364/475.07, 477.04; 425/143, 144, 548, 550, 547

[56] References Cited

U.S. PATENT DOCUMENTS

| | | | |
|---|---|---|---|
| 3,822,867 | 7/1974 | Evans | 274/40.6 |
| 4,707,310 | 11/1987 | Debeaud | 264/40.6 |
| 4,726,751 | 2/1988 | Shibata et al. | 425/144 |
| 5,153,007 | 10/1992 | Watkins | 425/143 |
| 5,280,422 | 1/1994 | Moe et al. | 364/140 |
| 5,397,515 | 3/1995 | Searle et al. | 264/40.6 |
| 5,456,870 | 10/1995 | Bulgrin | 264/40.6 |
| 5,683,633 | 11/1997 | Liehr | 264/40.6 |

*Primary Examiner*—Jill L. Heitbrink
*Attorney, Agent, or Firm*—Stephen H. Friskney

[57] ABSTRACT

A method for mold heater startup and sequencing detects the heater zones associated with greater mass and allows them to heat up before zones of lesser mass, thereby reducing wear of the associated mechanical components and minimizing degradation of plastic material. The zones of smaller mass are kept at minimal temperatures until the zones with greater mass reach a set point. The system is capable of detecting multiple levels of thermal load and provides appropriate sequential startup of the identified thermal loads. The operator may also manually program the system to override certain automated sequences in order to ensure an optimal startup sequence. The sequencing of power application to large heaters also minimizes the peak current draw of the system.

3 Claims, 4 Drawing Sheets

MOLD HEATER STARTUP METHOD

BACKGROUND OF THE INVENTION

1. Field of the Invention

The present invention relates generally to molds used in injection molding machines and, more particularly, to a method for sequencing the startup of electric heating elements used in such molds.

2. Description of the Related Art

The molds used to form injection molded products often include heating elements to control the temperature of certain portions (zones) of the mold. In particular, heaters are used in "hot runner" systems to provide a temperature controlled flow path for the plastic melt that travels from the injection unit of the molding machine to the mold cavity. Such systems typically include a manifold that supplies a number of nozzles that each supply melt to a mold cavity. Multiple heaters are strategically positioned throughout the mold and/or hot runner system to maintain the proper temperature and thereby ensure that good quality melt is used to form each part. However, given the various constraints on the number and location of heating elements, as dictated by a particular mold's construction (e.g., gates, coolant passages, core mechanisms, ejector pins, etc.), the thermal mass associated with each heater can vary considerably. If the heater zones are not properly sequenced at startup, there can be excessive wear on associated mechanical elements of the system (due to differences in thermal expansion), degradation of plastic within the mold, lengthy mold prep time, and unsuitable total current draw by the system.

Various startup systems have been proposed in the prior art. The simplest method is simultaneous startup of all zones. The molding machine operator implements this method by activating all zones of heat at the same time. The result is that zones with less mass ("fast rising" zones) reach the desired temperature more quickly, resulting in degradation the material while the operator is waiting for the other zones to reach the appropriate temperature. In addition, the time differential in reaching temperature can result in excessive wear of the associated sealing elements because the nozzles (and possibly other manifold components) have expanded in size and apply pressure on the manifold in one direction while the manifold is still expanding in another direction.

An alternative to simultaneous startup is manual sequencing of the heaters. In this method, the operator begins heater startup by switching electrical power to the heaters associated with the largest thermal masses (as determined by the operator, the manifolds, for example), allowing them to approach the temperature setpoint before turning on the heaters in the smaller zones (the nozzles, for example). If there are multiple levels of manifolds, the operator may turn on one level, then the next level and, finally, the nozzles.

Although manual sequencing can be an improvement over simultaneous startup, there are still several drawbacks. The operator may simply forget to sequence, turning on all heater zones at about the same time, resulting in the disadvantages for simultaneous startup noted above. In particular, uneven thermal expansion causes the fit between assemblies to grow tight before the manifolds have fully expanded. This causes wear and binding between adjoining surfaces, which can mean premature failure of the sealing elements between system components. Furthermore, nozzles usually come up to heat within a few minutes but the manifolds may take between 15 and 30 minutes to reach the desired temperature. This causes the material in the nozzles to degrade, possibly to the point where material flow becomes blocked—if this happens, it is necessary to disassemble and clean the system.

Manual sequencing also allows the operator to extend the total startup time considerably beyond what is actually required by being overly conservative in how the sequence is implemented. Alternatively, the operator may turn on the manifold heaters and leave the machine to attend to other matters. The manifold may actually be up to heat for some time before the operator returns to turn on the next level of manifold or the nozzles. Since this will extend the time the first level is under heat, it will extend startup time. The danger of material degradation is also present under these circumstances. To minimize startup time and material degradation, the operator has to monitor the process closely in order to determine when each level in the sequencing is up to heat and when to activate the next level.

A more automatic method is "uniform" startup where a computerized system monitors the rate of temperature rise of each zone of heating in the system. This type of control identifies the zones where the temperature is rising quickly and controls the power to the heaters to slow the rate of temperature increase. Basically, the computer allows the fast rising zones to reach a certain temperature and then inhibits further heat input, allowing the slower rising zones to "catch up." This process is continued until the temperatures for the various zones reach their setpoint.

Despite the more "uniform" thermal expansion of the different zones in this method, material degradation can still occur. For example, even though the nozzles may not reach the setpoint temperature for an extended period of time (while "waiting" for the manifold to reach temperature), they will still be at elevated temperatures for this extended period, resulting in some material degradation. In addition, wear still occurs even though all system components are coming up to heat and expanding at roughly the same rate. While this method reduces some of the wear and degradation problems, it does not eliminate them. It treats all zones of heat the same by providing a uniform rise in heat of all zones. As such, it does not actually sequence the startup.

It should be noted that the electrical heaters used in the described systems are often hygroscopic; i.e., they absorb moisture from the air and must be "dried out" before full voltage or power is applied. If not properly dried prior to applying full power, the heaters may be permanently damaged. Although manifold heaters are often constructed in such a way that moisture absorption is not a problem, nozzle heaters rarely are. This difference suggests that the manifold heaters may not require dry-out at the onset of the startup procedure, while the heaters for the nozzle zones must always be properly dried out before applying full voltage. According to the methods of the prior art, dry-out of the nozzle heaters does not commence until they are turned on, usually after the manifolds are nearly up to temperature; this further extends startup time. Only the "uniform" method allows for dry-out of all zones during the sequencing. Unfortunately, the "uniform" method also allows for significant rise in heat of the nozzles, resulting in thermal expansion and material degradation, as described above.

SUMMARY OF THE INVENTION

Accordingly, it is an object of the present invention to provide a method of controlling the activation and sequencing of the heater zones that results in less wear of sealing elements and effectively prevents the degradation of plastic melt due to prolonged exposure to heat.

Consistent with the stated objective, the method of the present invention involves detecting the heater zone having the largest mass, applying heat to that zone, thus allowing that segment of the mold to grow (expand due temperature rise) unimpeded. The heater zones associated with smaller mass are kept at minimal temperatures until the larger zones come up to heat. The system is capable of detecting multiple levels of rates of temperature increase and can provide sequential startup of these differing types of thermal loads. The operator may also manually program the system to override certain automated sequences in order to guarantee a startup sequence that best minimizes mechanical wear and prevents the degradation of plastic material.

The mold heater startup sequencing method of the present invention monitors the rate of temperature increase in the various zones to determine the relative thermal mass; i.e., the larger the mass, the slower the temperature increase. The method then applies power to the zones of higher mass to control thermal expansion of the primary mold elements in a way that minimizes wear of the associated mechanical components and sealing elements. The heater startup method also minimizes or prevents the degradation of plastic material by reducing the amount of time that the material is subject to high temperatures. In addition, the disclosed method serves to minimize the amount of time it takes to prepare the molding system for operation while accomplishing the previously noted advantages for system startup. Lastly, the sequencing of power application to large heaters, as taught by the present invention, reduces the peak current draw of the system, helping to prevent electrical circuit overloads and peak demand charges from utility companies. The apparatus associated with the disclosed method includes suitable microprocessor(s), analog to digital converter(s) and triacs (or other suitable power switching devices) that are operatively coupled to the heaters and corresponding temperature sensors in each zone.

DESCRIPTION OF THE PREFERRED EMBODIMENT

Figure 1:
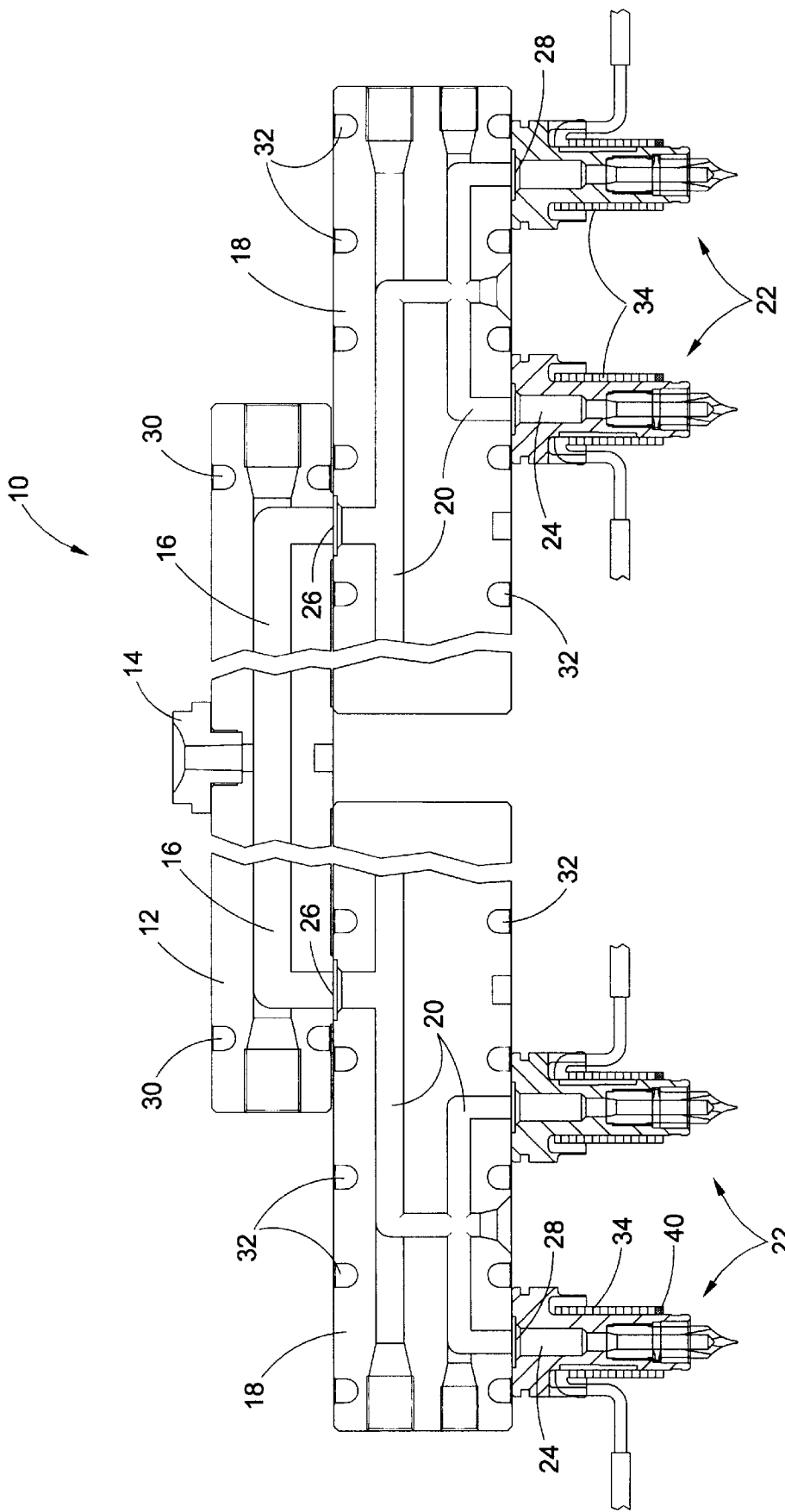
FIG. 1 is an elevational view, shown partially in section, of a hot runner system for an injection mold, including heating elements controlled according to the method of the present invention.

The method of the present invention is typically employed in association with electric heating elements that are used to provide supplemental heat to components associated with an injection mold. FIG. 1 illustrates a hot runner system 10 that is used to convey thermoplastic melt from the injection unit of an injection molding machine to multiple mold cavities. The is a "level one" manifold 12 that receives the flow of plastic melt from the injection unit though a nozzle adapter 14. The plastic melt is conveyed through conduits 16 in the level one manifold 12 to be received by two "level two" manifolds 18. The level two manifolds 18 also include flow passages 20 to convey the melt from the level one manifold 12 to multiple nozzles 22. Each of the nozzles 22 is in communication with a mold cavity in order to convey the plastic melt received from an associated flow passage 20 in the level two manifold 18, through a central passage 24 and into the mold cavity.

Since the plastic melt is in a fluid state during production operation of the injection molding machine, it is necessary for the connections between the manifolds and nozzles to be fluid tight. For this reason, seals 26 are provided at the junction of the passages 16 of the level one manifold 12 with the passages 20 of the level two manifold 18. Similarly, seal rings 28 are provided at the junction of the passages 20 of the level two manifold 18 with the central passages 24 of the nozzles 22.

Figure 2:
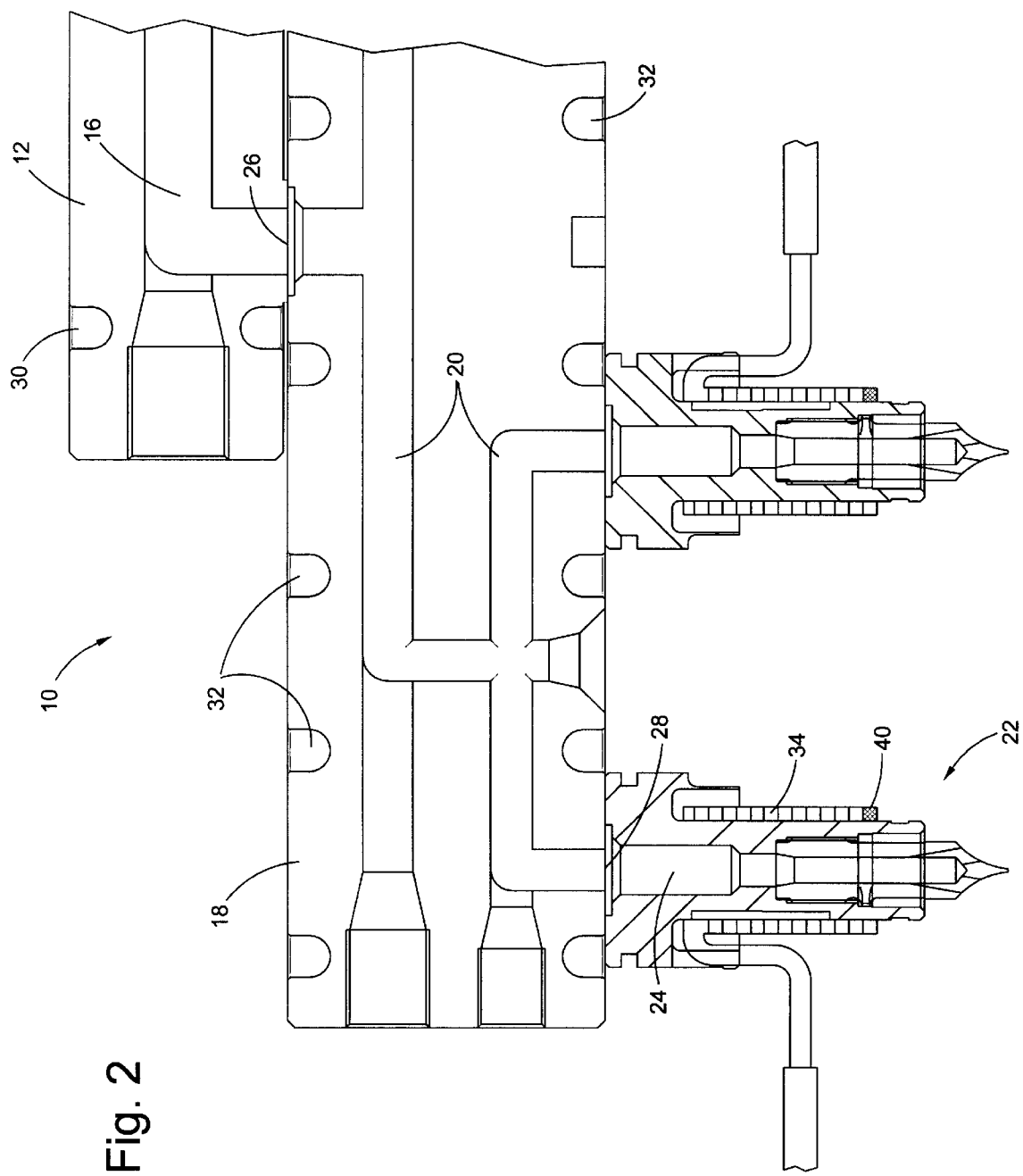
FIG. 2 is an enlarged view of a portion of the hot runner system for an injection mold illustrated in FIG. 1.
Figure 3:
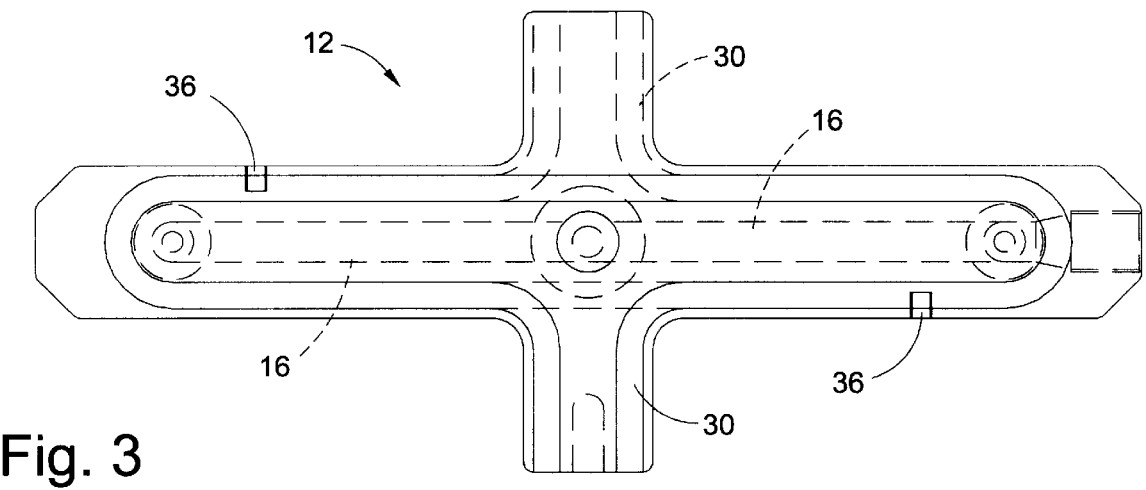
FIG. 3 is a top view of the level one manifold of the hot runner system for an injection mold illustrated in FIG. 1.
Figure 4:
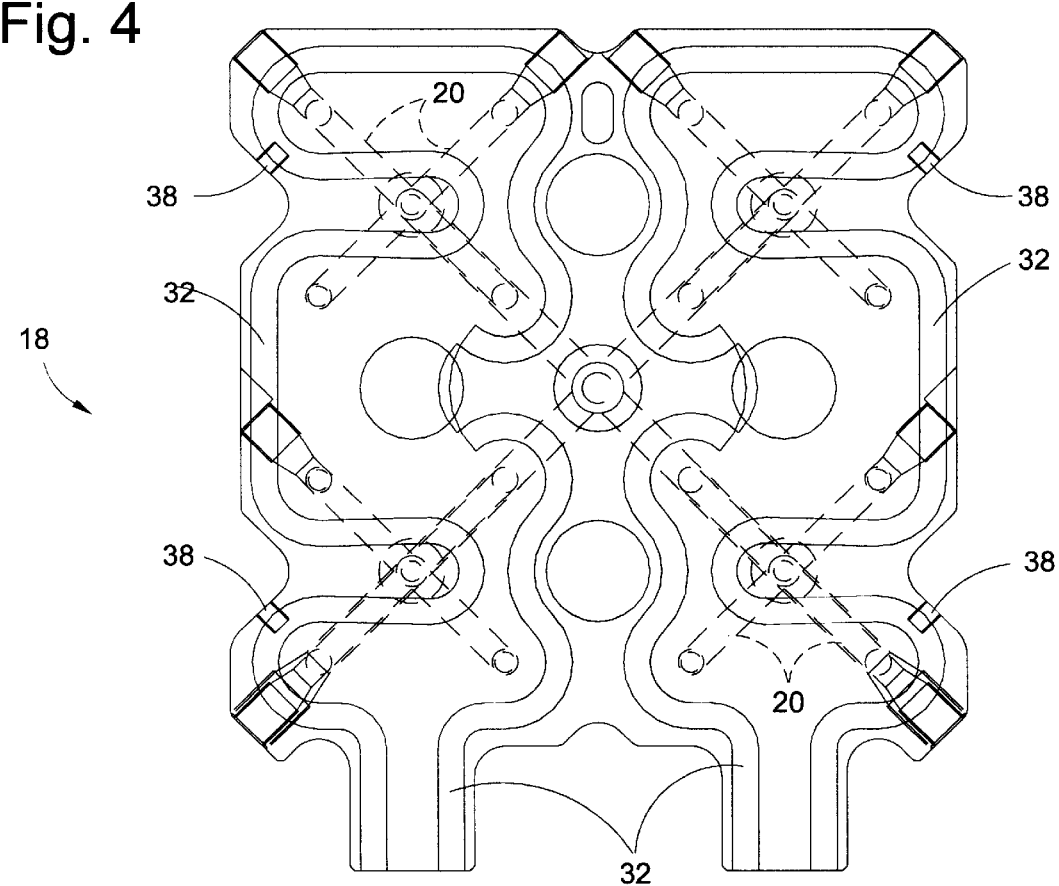
FIG. 4 is a top view of the level two manifold of the hot runner system for an injection mold illustrated in FIG. 1.

The hot runner system 10 is provided with multiple heating elements in order to bring the components (manifolds 12,18 and nozzles 22) up to a suitable operating temperature (at initial start-up) and maintain the desired temperature of the plastic melt as it is conveyed to the mold. Typically, the desired operating temperatures are dictated by the type of plastic material used in a given application. As shown more clearly in FIGS. 2–4, the level one manifold 12 has two heating elements 30 encircling the flow passage 16. Similarly, the level two manifolds 18 have two sets of serpentine heating elements 32 to supply heat in close proximity to the flow passages 20. Alternatively, the manifolds 12, 18 could be fitted with standard cartridge type heaters, rather than the elongated, serpentine elements shown. The nozzles 22 are equipped with heating elements 34 that encircle the main body of the nozzles 22 to ensure proper flow through the central passage 24.

The effect that the heaters have on the components of the hot runner system 10 is monitored by multiple thermocouples positioned to indicate accurately the thermal gradients in the system. In particular, as shown in the drawings, the level one manifold 12 has thermocouples 36, the level two manifolds 18 have thermocouples 38 and the nozzles 22 are provided with thermocouples 40. The setpoints for the heaters are initially based on the type of plastic being processed and are adjusted, often by trial and error, to achieve a set of conditions that facilitate continuous operation of the injection molding machine without "hot spots" that can cause material degradation.

However, there are various circumstances that require the operation of the injection molding machine to be stopped; e.g., mold change, color change, mold maintenance, etc. Obviously, when the heaters are turned "off", the plastic contained in the flow passages 16, 20, 24 solidifies. When it is later desired to restart the molding process, the material in the flow passages 16, 20, 24 must be re-melted before the machine can be operated to produce parts. The heaters 30, 32, 34 must be controlled so that (a) the thermal expansion of the components is relatively uniform to avoid damaging the seals 26,28 and (b) the plastic material is not held at temperatures that will cause it to degrade. These are the principle objectives of the heater start-up method of the present invention.

Figure 5:
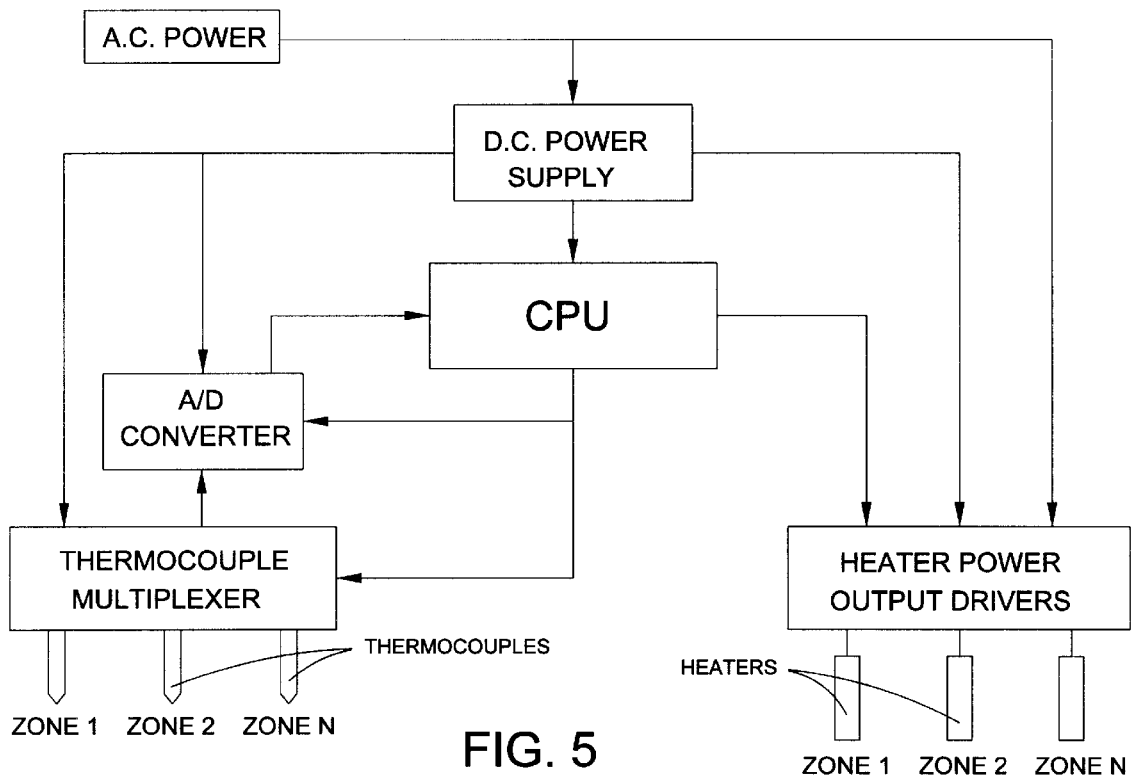
FIG. 5 is a diagrammatic representation of a single microprocessor control system that includes the mold heater startup method of the present invention.

As illustrated in FIG. 5, the method of the present invention can be implemented by a control system that uses a single microprocessor (CPU) to monitor and control the temperatures in all heater zones for a particular mold configuration; this is generally referred to as a multiplexed or multi-loop control system.

Alternatively, the heater startup method can be included in a modular heater system constructed from multiple singleloop control modules (see FIG. 6) where a communications interface between the modules allows the independent heater zones to communicate with each other so that the desired startup sequence can be implemented. More specifically, in the modular configuration, a neural network or other communication means is utilized to allow each zone to share information with other zones to determine the relative thermal characteristics of the zones. Generally speaking, it is likely that the heater zones of a hot runner system will be broken into two, three or more sets of thermal characteristics. Each set becomes a "level" to be included in the startup sequence. The set with the fastest rate of heat rise characteristics will typically be the zones including nozzle heaters 34. These "fast rising" zones will be the last to be sequenced in all cases.

In hot runner systems where there are multiple sets of "slow rising" heater zones (multiple manifold levels, for example), it may be necessary for the operator to determine the sequence; i.e., which set will be the first to be powered up, which is the next, etc. Furthermore, even when the method can automatically detect the different thermal sets, the system is designed to have sufficient flexibility to allow the operator to determine which set is to be sequenced first. In other words, the operator would be allowed to sequence the zones in such a way that might possibly override the automatically determined sets and sequence.

Implementation of the method of the present invention begins with all zones being activated in a dry-out mode; i.e., very low voltage (or power). Using feedback generated by appropriate sensors during the initial part of the dry-out mode, the "slow" and "fast" heater zones are identified. More specifically, a large current draw by a particular zone during dry-out would indicate there are high-power heaters in this zone that would be associated with a large thermal mass. Conversely, a low current draw by a particular zone indicates smaller heaters associated with less thermal mass. Alternatively, the determination of slow and fast heater zones can be made more directly by calculating the rate of temperature in the various zones during dry-out; the higher the rate, the "faster" the zone.

Once dry-out of the "slowest" zone has been completed, a predetermined voltage is applied to bring that zone to its programmed set point. Depending on the mold construction, voltage may be applied to multiple zones if no adverse expansion will occur. In any case, the application of the low (dry-out) voltage is maintained for the "fast" zones until the "slow" zones have all reached their set point temperatures. Application of low voltage means that there will only be minimal temperature rise in the "fast" zones to prevent undesirable thermal expansion and degradation of material.

If there are only two levels to be sequenced, the heater zones for the nozzles will be released from low voltage (dry-out) when the single set of manifolds reaches a predetermined temperature (often the lower end of the control's proportional or alarm band). With the multiple levels of manifolds, the second level manifold will be released from dry-out when the first level achieves the predetermined temperature; this process is continued until all manifold levels reach the desired set point. Finally, the heaters for the nozzles are activated to bring them up to temperature. Preferably, the system control would allow the operator to input the predetermined (set point) temperatures that trigger the startup of the next level or set of heater zones.

Although this sequence for heater start-up means that the manifolds will hold temperature for some amount of time before the nozzles come up to heat, material degradation in the manifolds is insignificant. The manifolds have large flow channels and more thermal mass that allow them to distribute the heat without adverse effects. In contrast, if material in the small orifices of the nozzles is held at an elevated temperature for a prolonged time, degradation is likely.

If desired, the method of the present invention could be used in conjunction with the "Mold Heater Moisture Detection and Dry Out Apparatus" disclosed in U.S. Pat. No. 5,039,842 to (a) prevent the application of if a large amount of ground leakage current was detected and/or (b) shut-off power to a heater if the ground leakage current exceed a preset maximum and cannot be corrected with the application of low voltage.

Figure 6:
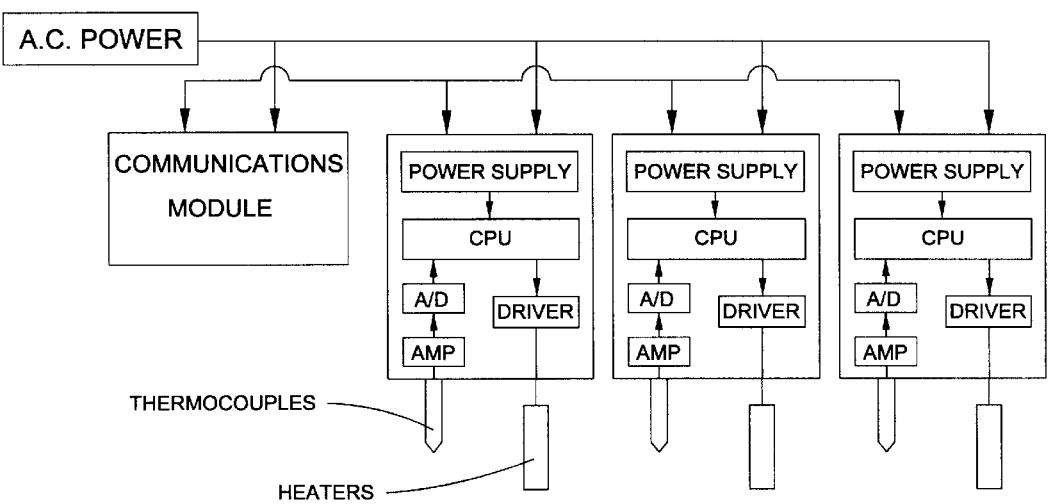
FIG. 6 is a diagrammatic representation of a modular control system that includes the mold heater startup method of the present invention.

In the preferred embodiment, microprocessors are used to determine the thermal properties of the zones quickly and automatically. Optionally, the operator could enter the thermal relationship of the zones, if known, into the control system manually via keyboard, touch-screen or other means as known in the art. However, in a modular control system (as generally shown in FIG. 6), the modules may be programmed using physical switches or jumpers to provide the desired thermal level identification.

With the preferred embodiment, the heater zone sets are displayed on a computer screen or other appropriate readout to provide visual feedback to the operator. The operator would then be able to modify the set assignment for each zone, if desired. The operator would also be able to enter this information prior to performing an initial startup of the control system.

Finally, in the preferred embodiment, the control system would allow the operator to save the learned and/or programmed thermal mass relationship of the heater to a storage device, such as hard/floppy disk, or solid state memory devices, such as battery backed RAM, EEPROM, EAROM, or flash ROM. The same storage device could also store the setpoint temperatures used to determine when to sequence startup of the subsequent levels.

While the invention has been illustrated and described in some detail according to the preferred embodiment, there is no intention to thus limit the invention to such detail. On contrary, it is intended to cover all modifications, alterations, and equivalents falling within the spirit and scope of the appended claims. For example, depending on mold construction, a single zone may include more than one heater or different heater configurations. In addition, other systems or mechanisms can be used to control the supply of electric power to the heaters.

What is claimed is:

1. In an injection molding system including a mold with a heated runner system for supplying plastic melt to a cavity within the mold and a plurality of heating elements associated with the mold and runner system, a method for bringing the mold and runner system to a desired operating temperature comprising the steps of:

(a) positioning the heaters within the mold and runner system to divide the mass of the mold and runner system into multiple zones, (b) positioning temperature sensors within each zone to provide feedback concerning the temperature within the associated zone at any point in time, (c) applying a controlled current to the heating elements within each zone for a defined period of time, (d) monitoring the temperature of each zone using the feedback from the temperature sensors;

(e) determining the rate of temperature increase for each zone based on the temperature change produced by the controlled current and thereby identifying the relative thermal mass associated with each zone;

(f) establishing a startup sequence for the zones based on the relative thermal mass determined in step (e) so that the heaters in the zones having greater thermal mass will be activated to heat the associated mass of the mold and runner system to a predetermined set point before the heaters in the zones having less thermal mass are actuated.

2. In an injection molding system including a mold with a heated runner system for supplying plastic melt to a cavity within the mold and a plurality of heating elements associated with the mold and runner system, a method for bringing the mold and runner system to a desired operating temperature comprising the steps of:

(a) positioning the heaters within the mold and runner system to divide the mass of the mold and runner system into multiple zones, so that potential heater output is proportional to the mass of the associated zone, (b) positioning temperature sensors within each zone to provide feedback concerning the temperature within the associated zone at any point in time, (c) applying a controlled voltage to the heating elements within each zone for a defined period of time, (d) monitoring the resulting current supplied to the heaters in each zone;

(e) determining the relative thermal mass associated with each zone based on the amount of current supplied to each zone, and (f) establishing a startup sequence for the zones based on the relative thermal mass determined in step (e) so that the heaters in the zones having greater thermal mass will be activated to heat the associated mass of the mold and runner system to a predetermined set point before the heaters in the zones having less thermal mass are actuated.

3. The method set forth in claim 1 or 2 further comprising the step of:

(g) adjusting the startup sequence established in step (f) based on input from the operator to in order optimize the heater startup sequence.

* * * * *